(12) United States Patent
Shiffer (10) Patent No.: US 6,613,254 B1
(45) Date of Patent: Sep. 2, 2003

(54) METHOD FOR MAKING EXTRUDED, ORIENTED FIBER

(75) Inventor: Irwin J. Shiffer, Belle Mead, NJ (US)

(73) Assignee: Ethicon, Inc., Somerville, NJ (US)

( * ) Notice: Subject to any disclaimer, the term of this patent is extended or adjusted under 35 U.S.C. 154(b) by 152 days.

(21) Appl. No.: 09/687,873

(22) Filed: Oct. 13, 2000

Related U.S. Application Data (60) Provisional application No. 60/160,478, filed on Oct. 19, 1999.

(51) Int. Cl.[7] .................. B29C 47/92; D01D 5/088; D01D 5/16
(52) U.S. Cl. .................. 264/40.1; 73/160; 264/40.3; 264/40.6; 264/40.7; 264/129; 264/210.8; 264/211.12; 264/211.14; 264/342 RE; 700/122
(58) Field of Search .................. 264/40.1, 40.3, 264/40.6, 40.7, 129, 210.8, 211.12, 211.14, 342 RE; 73/160; 700/122

(56) References Cited

U.S. PATENT DOCUMENTS

| | | |
|---|---|---|
| 3,359,983 A | 12/1967 | Northey |
| 3,630,205 A | 12/1971 | Listner |
| 4,451,116 A | 5/1984 | Pinnow et al. |
| 4,520,822 A | 6/1985 | Menezes et al. |
| 4,557,264 A | 12/1985 | Hinsch |
| 4,620,542 A | 11/1986 | Menezes et al. |
| 4,621,638 A | 11/1986 | Silvestrini |
| 4,911,165 A | 3/1990 | Lennard et al. |
| 5,217,485 A | 6/1993 | Liu et al. |
| 5,682,146 A | 10/1997 | Neumann |
| 5,871,502 A | 2/1999 | Suryadevara |

FOREIGN PATENT DOCUMENTS

| | | |
|---|---|---|
| EP | 0 553 882 A1 | 8/1993 |
| EP | 0 856 775 A1 | 8/1998 |
| JP | 59 211103 A | 11/1984 |
| JP | 60 35417 A | 2/1985 |

OTHER PUBLICATIONS

Patent Abstracts of Japan, vol. 009, No. 079 (P–347), (Apr. 9, 1985) JP 59 211103A.
Database WPI; Section Ch. Week 198514, Class A32, AN 1985–084199—XP002193616, Derwent Publications Ltd., London, GB.
Reshadat Ramin et al., Abstract of article: "Quality Monitoring of Recycled Plastic Waste During Extrusion: I. In–Line Near–Infrared Spectroscopy"—XP002197263, Proceedings of the 53rd Annual Technical Conference, Part 2 (of 3), vol. 2, pp 2057–2061 (1995).
Ramin Reshadat et al., "In–Line Near–Infrared Monitoring of Polymer Processing. Part I: Process/Monitor Interface Development", Applied Spectroscopy. The Society for Applied Spectroscopy, Baltimore, US, 53(11):1412–1418, XP000888393 ISSN: 0003–7028 (1995).
EPO Search Report for Application No. EP 00 30 9185— Dated May 7, 2002.
Cynthia A. Lowry, William H. Woodall, Charles W. Champ, and Steven E. Rigdon, "A Multivariate Exponentially Weighted Moving Average Control Chart", *Technometrics*, Feb. 1992, vol. 34, No. 1, American Statistical Association and The American Society for Quality Control.

(List continued on next page.)

*Primary Examiner*—Leo B. Tentoni (57) ABSTRACT

The present invention includes processes for making fibers, which processes include an extrusion step wherein molten polymers are extruded through an extrusion die, thereby forming at least one extruded filament; and an orientation step, wherein the filament is drawn to align the molecules of the filament, and wherein multivariate data analysis techniques are used to analyze data regarding various process variables and, optionally, process variables are adjusted in response to the multivariate data analysis.

4 Claims, 10 Drawing Sheets

OTHER PUBLICATIONS

Joseph J. Pignatiello, Jr. and George C. Runger, "Comparisons of Multivariate CUSUM Charts," *Journal of Quality Technology*, Jul. 1990, vol. 22, No. 3, Douglas C. Montgomery, "Introduction to Statistical Quality Control", John Wiley & Sons, Inc., New York, 1996.

John F. Macgregor, "Using On–Line Process Data To Improve Quality," Chemical and Process Industries Division News, Winter 1995, pp. 1–7.

Dr. Alfred Huthig Verlag, "Multivariate Data Analysis: Converting Chemical Data Tables to Plots," Svante Wold, Research Group for Chemometrics, Umed University, S–901 87, Umed, Sweden, 1989.

Theodora Kourti, John F. MacGregor, "Process Analysis, Monioring and Diagnosis, Using Multivariate Projection Methods," Chemometrics and Intelligent Laboratory Systems 28 (1995), pp. 3–21.

Theodora Kourti and John F. MacGregor, "Multivariate SPC Methods for Process and Product Monitoring," Journal of Quality Technology, vol. 28, No. 4, Oct. 1996, pp. 409–428.

Paul Nomikos and John F. MacGregor, "Multivariate SPC Charts for Monitoring Batch Processes," Technometrics, Feb. 1995, vol. 37, No. 1, pp. 41–59.

Paul Nomikos and John F. MacGregor, "Monitoring Batch Processes Using Multiway Principal Component Analysis," AIChE Journal, Aug. 1994, vol. 40, No. 8, pp. 1361–1375.

"Cross–Validatory Estimation of The Number of Components in Factor and Principal Components Models," Svante Wold, Nov. 1977, pp. 397–405.

Paige Miller, Ronald E. Swanson, and Charles E. Heckler, "Contribution Plots: A Missing Link In Multivariate Quality Control (revision 3)," Eastman Kodak Company, Nov. 30, 1995, pp. 1–19.

Paul Geladi and Bruce R. Kowalski, "Partial Least Squares Regression: A Tutorial," 1986 Elsevier Science Publishers B.V., pp. 1–17.

METHOD FOR MAKING EXTRUDED, ORIENTED FIBER

This application claims the benefit of U.S. Provisional Application No. 60/160,478, filed on Oct. 19, 1999, the content of which is incorporated herein by reference.

FIELD OF THE INVENTION

This invention relates to processes for making fibers that are both extruded and oriented, which processes utilize multivariate data analysis techniques.

BACKGROUND OF THE INVENTION

Many processes for making extruded, oriented fibers are known. Such fibers are extruded from molten polymer and then drawn by various methods in order to orient the fiber. Orientation is a known term of art and generally means that the molecules of the fiber are aligned in order to give the extruded fiber certain physical properties required for its particular use. Such fibers are used in a number of applications. For example, extruded and oriented fibers are used in optical fibers and for the manufacture of optical wave guides. In addition, such fibers may be used in the textile industry, e.g. in the manufacture of clothing, carpets, etc. Such fibers also may be used in the manufacture of surgical sutures.

Due to the complex relationship of the various process and product variables in such processes and the extremely short time in which extrusion and orientation occurs, the manufacture of such fibers requires critical control and coordination of the extrusion and orientation processes. In addition, conventional start-up of such conventional processes often requires numerous iterations of monitoring, testing, adjusting, etc. and often results in lost time and raw material due to excessive iterations.

It would be advantageous to provide processes for making extruded, oriented fibers, which processes provide improved control over product and process variables.

SUMMARY OF THE INVENTION

The present invention includes processes for making fibers. The processes comprise an extrusion step wherein molten polymers are extruded through an extrusion die, thereby forming at least one extruded filament; and an orientation step, wherein the filament is drawn to align the molecules of the filament, and wherein multiple process variables of the extrusion step, and optionally the orientation step, are monitored and data collected with respect thereto. The collected data are analyzed using a multivariate data analysis technique and, optionally, process variables are adjusted in response to the multivariate data analysis.

DETAILED DESCRIPTION OF THE INVENTION

Processes of the present invention are used to manufacture fibers that are both extruded and oriented. According to processes of the present invention, multivariate data analysis techniques are used to analyze data regarding various process and product variables. Based on the multivariate data analysis (MVDA), process variables may be adjusted in order to maintain product variables within predetermined, acceptable specifications. While the MVDA may suggest adjustment of certain process variables, such suggestions may be used by human operators as guidance in selecting which, if any, processes variables should be adjusted. Alternately, automatic process control systems, such as on-line computers interfaced with process and product variable sensor means and manufacturing apparatus, may be used to adjust process variables based on the MVDA. Process variable sensor means may be any of those commonly known for use in monitoring and collecting process data, for example, pressure sensors, thermal sensors, speedometers, etc. Means for measuring product variables described herein also may include known devices, such as those for measuring diameters, tensile strength, etc. By applying MVDA to selected process variables of the particular fiber process, control of such processes and fibers made thereby may be improved.

Fibers made according to processes of the present invention may be used in a number of applications including, without limitation, optical fibers, textiles and surgical sutures. General processes for making such fibers are known in the art and are discussed in U.S. Pat. Nos. 3,359,983, 3,630,205, 4,520,822, 4,557,264, 4,620,542, 4,621,638, 4,911,165, 5,217,485, 5,871,502 and 4,451,116, the contents of each of which is hereby incorporated by reference in its entirety. By applying MVDA to selected process variables of the various extrusion processes, control of such processes and product made thereby may be improved to the extent that waste in raw material and process time, particularly start-up time, may be reduced significantly.

Suitable polymers for use in the present invention are well known. By far, the most widely used polymers for medical applications are aliphatic polyesters, however, polyoxalates and polyoxaesters are also well suited for use in the present invention Polypropylene also may be used.

Lactone monomers have been described in the art, for example in Polymer, 1979, Vol. 20, 1459–1464 by Gilding and Reed. Examples of lactone monomers include monomers selected from the group consisting of glycolide (or glycolic acid) lactide, (D, L, meso and D,L blends and lactic acid) 1,4-dioxanone, trimethylene carbonate, δ-valerolactone, ε-caprolactone, 1,4-dioxepan-2-one, 1,5-dioxepan-2-one, alkyl substituted derivatives of these compounds, cyclic dimers of these compounds and combinations of two or more thereof. The preferred lactone monomers are ε-caprolactone, 1,4-dioxanone, 1,4-dioxepan-2-one, 1,5-dioxepan-2-one, trimethylene carbonate, glycolide and lactide. The most preferred lactone monomers are ε-caprolactone, 1,4-dioxanone and glycolide.

Any of the polymers used in the manufacture of conventional textiles also may be used in processes of the present invention, as well as those commonly used in the manufacture of optic fibers.

Processes of the invention can reduce overall time in the start-up portion of the process and variability in production, as well as aid in control of product variables such that they are maintained within predetermined, acceptable specifications. The exact nature of the relevant process and product variables to be monitored depends upon the particular process being practiced and the performance properties required of the particular fiber being produced. Having the benefit of this disclosure, one skilled in the art will be able to readily ascertain the relevant process and product variables for a particular fiber-extrusion process and the appropriate MVDA to apply to the selected variables.

The use of MVDA in process control generally is established by such publications as Chemometrics and Intelligent Laboratory Systems; *Process Analysis, Monitoring and Diagnosis Using Multivariate Projection Methods* (T. Kourti et al.)(1995); Computer Applications in Chemical Research and Education; *Multivariate Data Analysis: Converting Chemical Data Tables to Plots,* (S. Wold et al.)(1989) and Chemical and Process Industries Division News; *Using On-line Process Data to Improve Quality,* (J. Macgregor) (1995). It now has been discovered that MVDA can be used in processes for making extruded and oriented fibers, in order to aid in the control of product quality and to improve or simplify processes for making such fibers.

Generally, MVDA is a collective term for methods that extract information from data tables. Multivariate data contain more information than a single variable and many times contain variables on the order of tens or hundreds of variables. In complex systems, such as those described herein, a single variable is rarely sufficient to classify a system or to quantitatively predict a property of the system. MVDA has been found to provide a means for considering multiple product and process variables and for improving process and product quality control based on information generated by MVDA.

Of known MVDA, multivariate statistical projection methods have been found to be particularly applicable to processes for making extruded and oriented fibers. Such methods include Principle Component Analysis (PCA), multi-way PCA, a method alternately referred to as Partial Least Squares or Projections to Latent Structures (PLS) and multi-block PLS. Such methods are discussed at length in Wold and Kourti. In PLS, a process variable data matrix and a product variable data matrix are established. The matrices may be established from historical production data, for example. Application of PLS statistical methods to the data can be used to identify or predict problems or deviations in the process, such that the problems can be avoided or limited, for instance, in the start-up of fiber extrusion processes. Having established a baseline of process and product information and having established acceptable product parameters, one may use information generated from the PLS analysis to adjust process variables in order to maintain acceptable product parameters, or to improve the process, for example by reducing raw material waste in start-up, reducing overall process time, etc.

Figure 1:
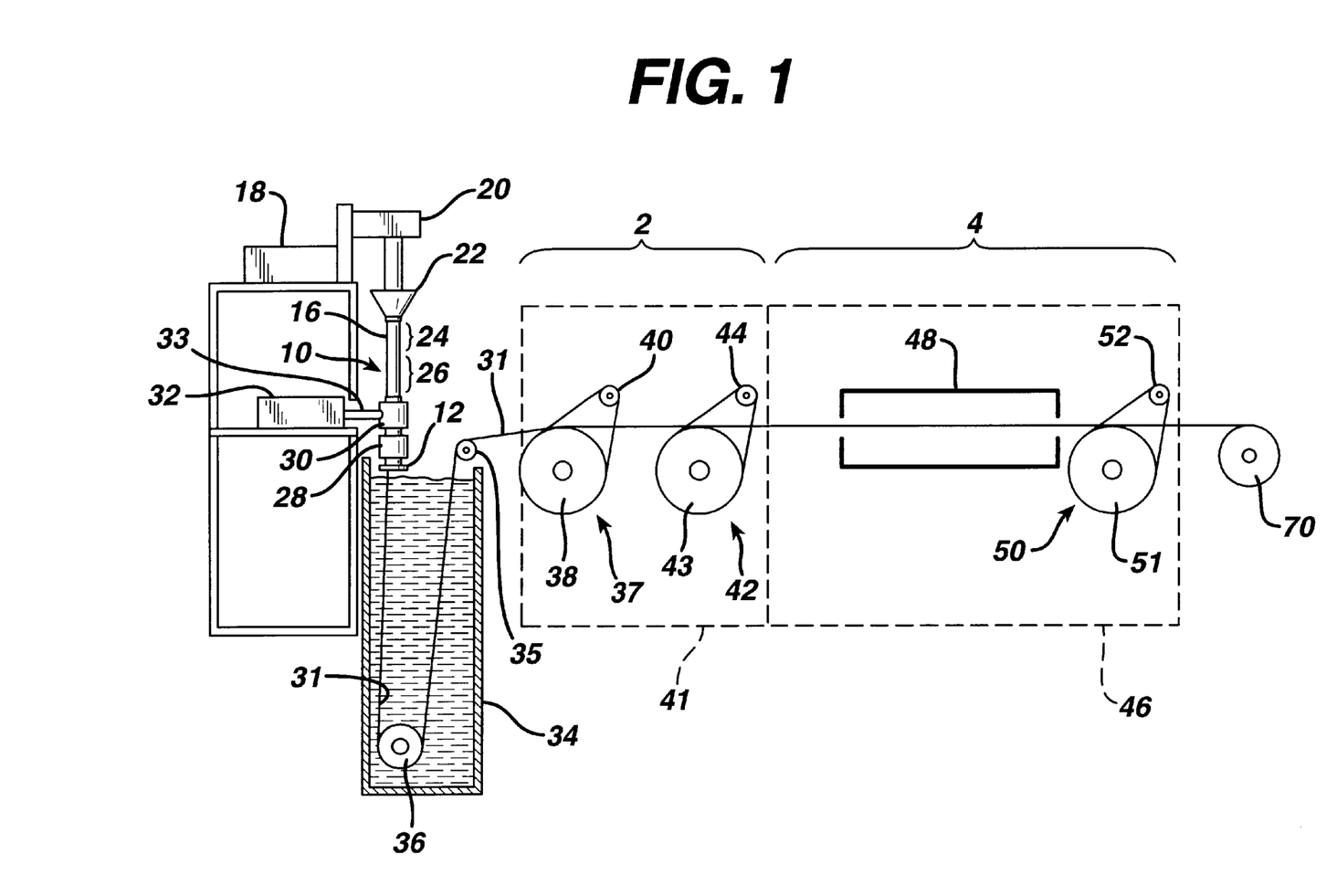
FIG. 1 is a side elevation, partially schematic of an apparatus suitable for carrying out the process of the present invention.
Figure 2:
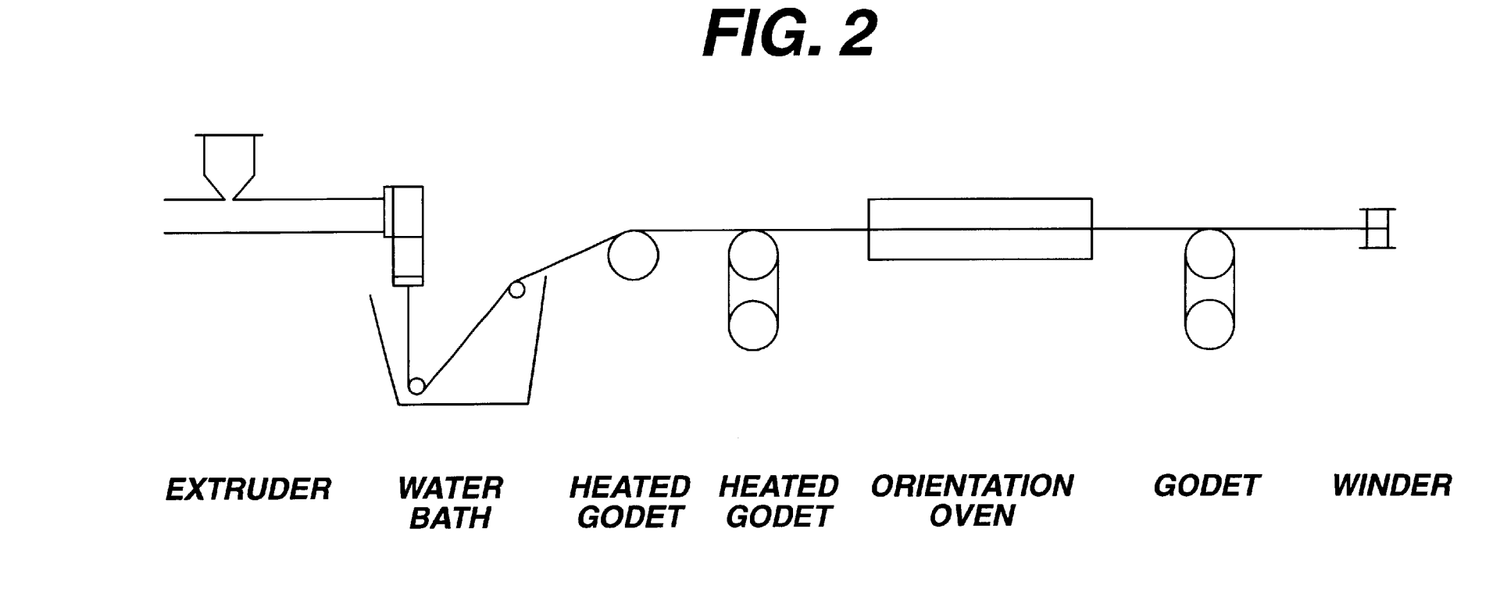
FIG. 2 is a side elevation, partially schematic of horizontal apparatus suitable for carrying out the process of the present invention.
Figure 3:
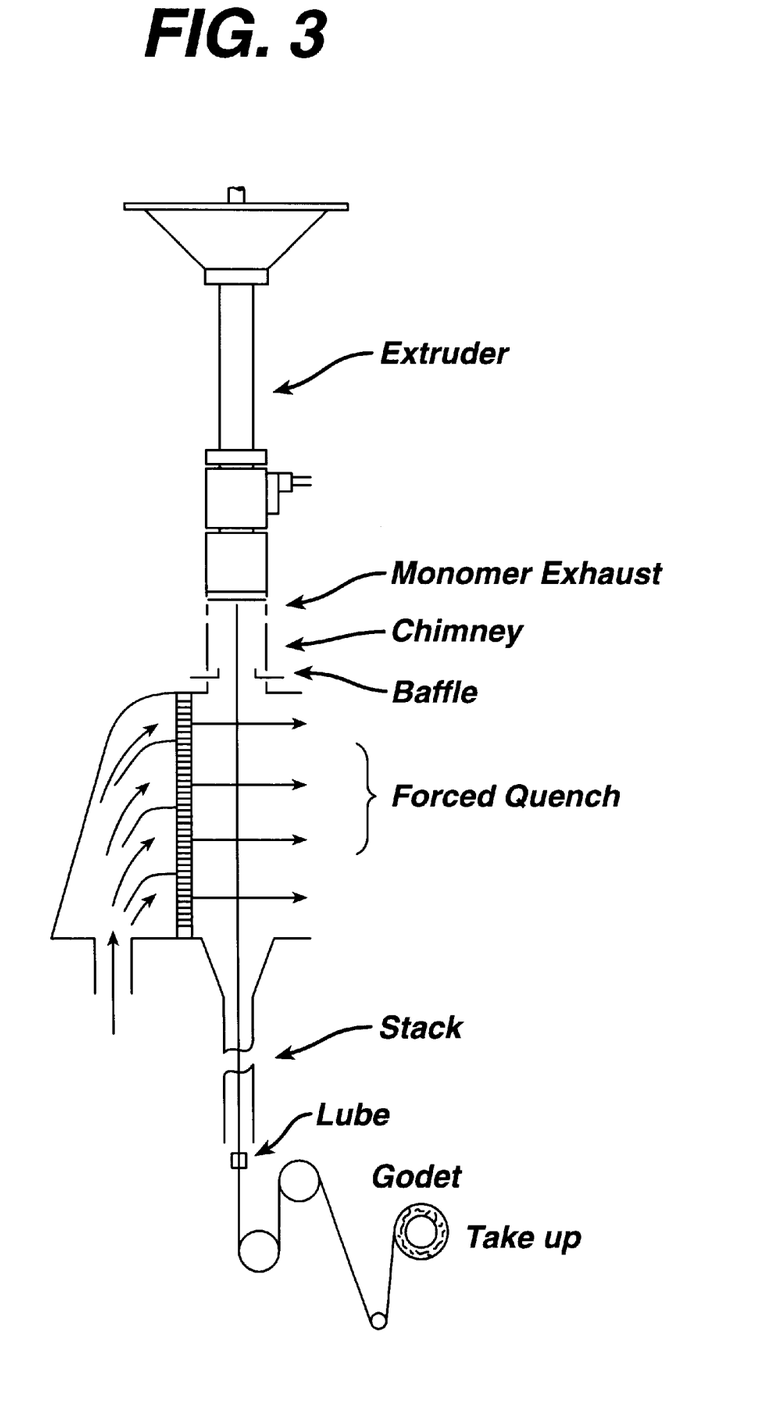
FIG. 3 is a side elevation, partially schematic of a vertical apparatus suitable for carrying out the process of the present invention.

Processes of the invention comprise an extrusion step and an orientation step. Extrusion and orientation of fibers is well known and those skilled in the art may use any of the known processes in the practice of the present invention. Processes may employ vertical extrusion/orientation (FIG. 3) or horizontal extrusion/orientation (FIGS. 1 and 2). Both steps may be practiced continuously in-line, such that the fiber is extruded and oriented prior to being processed further or taken up on a roll. Alternately, the extruded fiber may be placed on a roll prior to orientation and stored or held for subsequent orientation of the fiber. The extruded and oriented fiber may then be processed further. For example, for monofilament fibers, such as those used in the manufacture of sutures, the oriented fiber may go through a relaxation step and annealing step. For multifilament fibers, such as braided surgical sutures, the oriented fiber is braided, hot stretched to permanently set the braid characteristic through application of heat, annealed to remove internal tension and to set the structure of molecule crystallization, and optionally coated to reduce drag through tissue.

In one process for making polypropylene surgical sutures, MVDA can be used both to optimize start-up and for continued in-line process control. Referring to FIG. 1, there is shown an apparatus that is suitable for carrying out the present invention. An extruder 10 (which may be a horizontal or vertical extruder) is terminated at one end with an extrusion die 12. A longitudinal extruder screw is mounted for rotation within the barrel 16 and is driven by a variable speed motor 18 through a gear 20. Polypropylene pellets are introduced into the extruder through hopper 22 which communicates with the barrel 16. In normal operation of the extruder 10, the feeding zone 24 of the extruder is maintained at a temperature in the range of from about 140° C. to about 200° C., the transition zone 26 is maintained at a temperature in the range of from about 170° C. to about 220° C., and the pump block 30, block 28 and die 12 are maintained at a temperature in the range of from about 170° C. to about 225° C. A pump 33 driven by a motor 32, pumps the molten polypropylene through spinneret orifices in the die 12 to form a plurality of filaments 31 (for simplicity only one filament is shown in FIG. 1). The filament 31 is extruded into quench bath 34. The quench bath 34 is filled with a liquid heat exchange medium. The surface of the liquid in the quench bath 34 is preferably not more than a few centimeter below the die 12 in order to achieve rapid cooling of the extruded filament 31, (i.e. from in the range of from about 0.1 cm to about 20 cm). The quench bath 34 is maintained at a temperature below 50° C. and preferably the quench bath 34 is maintained at about 20° C. The filament 31 enters the quench bath 34 and travels around idler roll 36 in the quench bath 34 and then up out of the quench bath 34 to another idler roll 35 then to the first godet 37 in the first drawing zone 2. In the first drawing zone 2 the filament 31 is drawn in the range of from about 4.0 to 7.5 times its original length. The filament 31 may be drawn incrementally or in several discrete steps in the first drawing zone 2. The drawing will preferably be performed in a first heated zone 41 (such as a heated cabinet, oven, or by using heated godets) and a drawing pin may be used to stabilize the drawing point. The temperature of the first heated zone will preferably be in the range of from about 30° C. to about 170°

C. Most preferably, the first godet will be maintained at a temperature in the range of from about 40° C. to 140° C. and the second godet will be maintained at a temperature from about 60° C. to about 82° C. The filament 31 will remain in the first heated zone 41 generally only a short time preferably in the range of from about 0.1 seconds to about 5 seconds.

In one embodiment of the invention shown in FIG. 1, the filament 31 is drawn by a first godet 37 and a second godet 42. The first godet 37 includes a main roll 38 and an air bearing 40. The first godet 37 is rotated at a peripheral speed that is equal to or slightly higher than the speed at which the filament 31 is extruded from the die orifice 12. The first godet 37 may be combined with a pinch roller (not shown) to assure the filament 31 does not slip in the subsequent drawing to the extruded filament 31. The first draw of the extruded filament 31 will be performed by feeding the extruded filament 31 from the first godet 37 to second godet 42 which includes a main roll 43 and an air bearing 44. The second godet 42 is rotated at a peripheral speed that is in the range of from about 4.0 to about 7.5 times the speed of the first godet 37.

The filament 31 then passes into a second drawing zone 4, where the filament 31 is drawn again in the range of from about 1.0 times to about 2.5 times while in a second heated zone 46. The filament 31 may be drawn incrementally or in one or more discrete steps in the second drawing zone 4. The drawing will be performed in a second heated zone 46. The temperature of the second heated zone 46 will be in the range of from about 180° C. to about 280° C., preferably in the range of from about 195° C. to about 260° C. The filament 31 will remain in the second heated zone 46 generally only a short time preferably in the range of from about 0.1 seconds to about 5 seconds.

In a preferred embodiment of the invention shown in FIG. 1, the filament 31 passes through a second heated zone 46 to a third godet 50. The filament 31 is drawn in the range of from about 1 times to about 2.5 times, while traveling from the second godet 42 to the third godet 50 in the second heated zone 46. The third godet 50 includes a main roll 51 and an air bearing 52, that are rotating at a peripheral speed of about 1 times to about 2.5 times of the peripheral speed of the second godet 42. Preferably the draw ratio will be in the range of from about 1.06 times to about 1.9 times.

The total draw ratio may range from 4 times to about 8.5 times. Preferably, the draw ratio will be in the range of from about 7 times to 8.2 times and most preferably from 7.75 times to 8 times.

After the filament 31 has been drawn in accordance with the procedures described above it may be wound on a tube spool 70. It is then annealed in an oven and allowed to shrink from about 16 to about 35 percent of the original length (i.e., the final length will be from about 65 to 84 percent of the pre-shrink length). Preferably the suture will be wound on racks as described in U.S. Pat. No. 3,630,205 Listner assigned to Ethicon, Inc. (hereby incorporated by reference). Additionally, the ovens and racks should be configured to provide uniform heating to all the filaments.

After the drawing and annealing, the filaments of the invention are fabricated into surgical sutures in accordance with customary procedures. They can be produced in the usual USP sizes, for example, from size 2 down to size 11/0. They can be attached to needles by the usual procedures, and can then be sterilized (as by using ethylene oxide) and package in sterile packs ready for use.

In another process for making polypropylene surgical sutures, as described in U.S. Pat. No. 5,217,485 (incorporated by reference), isotactic polypropylene is melt extruded to provide a monofilament and the solidified monofilament is subjected to equilibration, stretching and annealing. In U.S. Pat. No. 4,451,116 (incorporated by reference), optical fibers and methods for making optical wave guides are disclosed.

In each of the processes noted herein above, relevant process and product variables are determined, product and process variable matrices and data baselines are established, and MVDA applied to the data. Process variables then can be adjusted, based on the results of the MVDA, so as to maintain product and process variables within predetermined, acceptable specifications.

The start-up stage of a process includes many iterations of adjustment of variables, reviewing variables, comparing the variable to standard specifications, testing of product, further adjustment of variables, and so forth. In a batch process, the start-up time can account for 10 to 50% of the total batch process time. Improved procedures for monitoring the start-up stage result in reduction in the number of iterations and a reduction in the mean and the variance of the start-up time. Such a reduction yields additional production capacity and savings in scrap. It also frees off-line testing resources, often a bottleneck. The reduction in variance leads to improved production planning, which in turn creates additional capacity.

In a study regarding a start-up process used in the batch manufacture of fibers for use in surgical sutures, PLS was used to analyze process variable and product variable data from the extrusion and orientation steps of 17 production runs. Product variables included diameter, roundness, tensile strength, elongation and knot strength of the extruded and/or oriented filament and process variables included extruder feed temperature, extruder transition temperature, extruder meter temperature, extruder die adapter temperature, extruder die cavity temperature, extruder melt temperature, extruder inlet water temperature, extruder outlet water temperature, extruder barrel pressure, extruder filter pressure, extruder pack pressure, extruder screw speed, extruder pump speed, quench tank temperature, take away godet speed, godet roller speeds, godet roller temperatures, oven temperatures and godet draw ratios. Once a baseline was established from the historical data, PLS analysis of the data resulted in observations which, had an operator had the benefit of such observations and had the operator had the opportunity to make certain adjustments to the process variables in response to such observations during actual start-up of the process, would have resulted in significant reduction of the start-up time and the number of start-up iterations and adjustments.

The start-up method considers the variables simultaneously and adopts a monitoring approach. The first step in the method is to transform the original variables into derived variables, denoted $T_i$, that are linear combinations of the original process variables $X_1$, $X_2$, . . . ;i.e., $T_i = w_{i1}X_1 + w_{i2}X_2 + w_{i3}X_3 + \ldots$ The T's serve three useful purposes. First, many variables are reduced to a few variables without losing the essence of information about the state of the system. Second, the T's enable simultaneous monitoring of the process variables. Third, the T's are independent and consequently easy to work with in contrast to the difficulties introduced by the correlations among the X's.

There are two major tasks to develop the start-up procedure. First, one defines the production baseline by determining the production characteristics of the product and process variables and the derived variables. This requires extensive study of production data to determine usual operation conditions. Second, one must develop rules to determine whether process variables during start-up are consistent with production baseline and determine which process variables require adjustment. For each batch used in the study, there are digital records of 34 process variables, taken every ten minutes during start-up and production plus additional process records on-demand during start-up.

The start-up monitoring methodology begins by establishing a production baseline so that conditions of start-up can be compared to that of usual production. The baseline is established by creating derived variables from the production baseline data using the method of PLS. Typically, 3–5 derived variables result. The derived variables from PLS are linear combinations of the dozens of original variables. The process variables are denoted as X's and the product variables by Y's. There are two types of derived variables: those that are linear combinations of the process variables, T's, and those that are linear combinations of the product variables, U's. The PLS procedure exploits the dependence of the product on the process variables.

Figure 4:
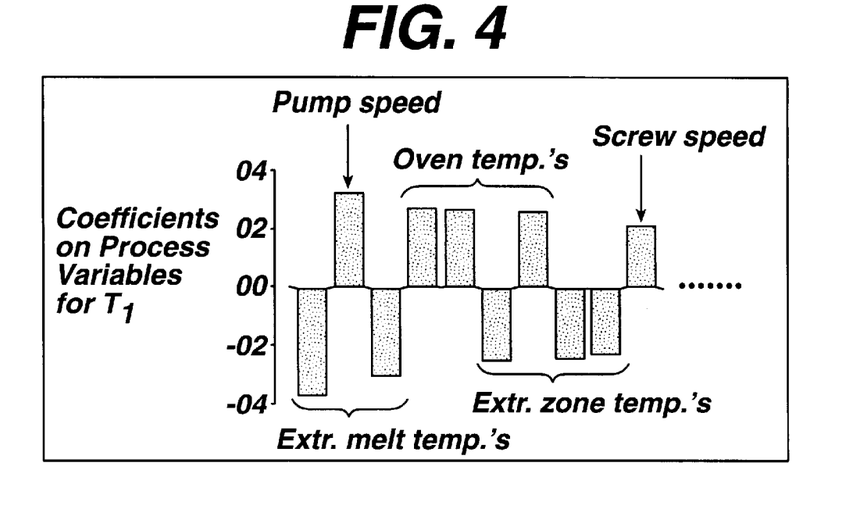
FIG. 4 is a bar chart regarding coefficients on process variables that form the linear combination for $T_1$.

FIG. 4 shows the first derived variable $T_1$, extracted from the production baseline data. The bar chart shows the size of the coefficients for the original process variables, X's, that form the linear combination for $T_1$. The linear combination for $T_1$ is $T_1=-0.38X_6+0.32X_{14}-0.31X_7+0.27X_{30}+0.27X_{29}$ . . . This combination of the process variables accounts for more variance in the process and product variables than any other. Similarly, additional T's can be extracted, each explaining the most remaining variance, at that stage, in the process and product variables. Several methods exist that suggest the appropriate number of T's to extract.

The next step is to determine how well the derived variables capture the actual data using a measure called squared prediction error (SPE). SPE is the sum of the squared differences between the observed and predicted X's; i.e., $SPE=(X_1-X'_1)^2+ \ldots +(X_p-X'_p)^2$, where $X_i$ and $X'_i$ are the observed and predicted values of the p process variables, respectively.

Figure 5:
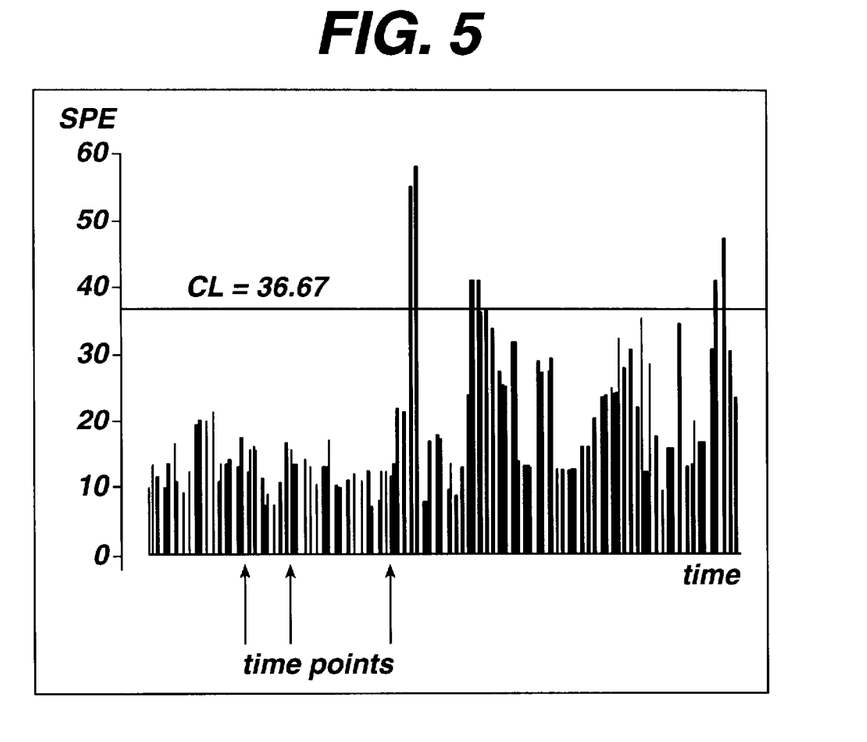
FIG. 5 is a bar chart with the time points of the production baseline data along the horizontal axis and corresponding SPE values along the vertical axis.

FIG. 5 shows a bar chart with the time points of the production baseline data along the horizontal axis and the SPE values for each time point along the vertical axis. The time points span over the course of 17 runs and consist of 340 observations.

Next, the production baseline SPE values are used to construct a control limit. The control limit is constructed using the method of Mackson and Mudnolkar. Bars taller than the control limit indicate unusual operating conditions. FIG. 5 shows this control limit, CL=36.67. This control limit becomes the baseline number for assessing the SPE values that will be obtained during start-up.

SPE is not the only measure of how well the T's capture the actual data. T's themselves are used to make this assessment. In making the PLS calculations, the process variables are mean centered; that is, the mean is subtracted from each process variable. Thus, the mean is zero for each process variable $X_i$ and for each derived variable $T_i$.

Figure 6:
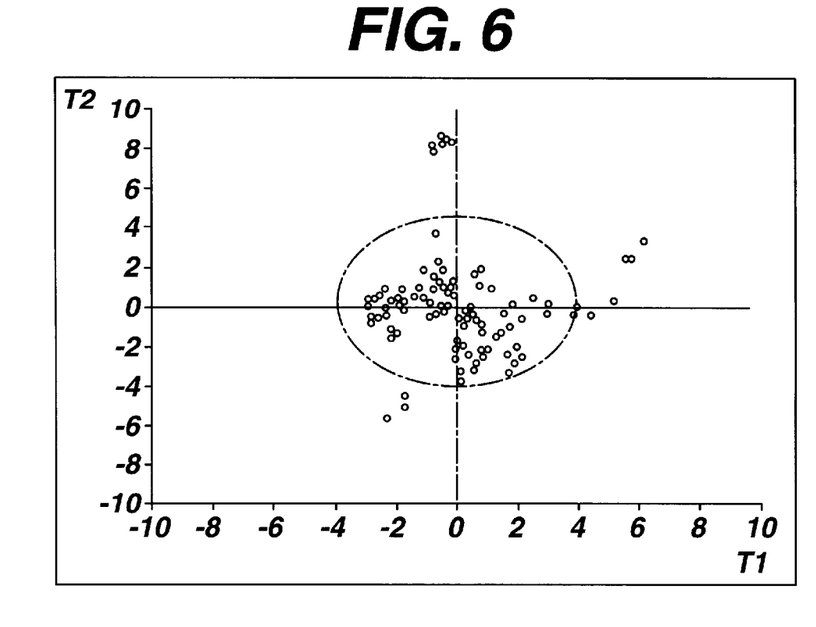
FIG. 6 shows a plot of $T_1$ versus $T_2$ for the production baseline data.

FIG. 6 shows a plot of $T_1$ versus $T_2$ for the production baseline data. It is expected to see the points clustered around the center. The T's follow approximately a multivariate normal distribution and, using this assumption, a confidence ellipse can be constructed for each plot. An approximate control ellipse is shown in FIG. 6. Points outside the control ellipse indicate unusual production. Similarly, pairwise plots of every other pair combination can be constructed. The control ellipses from the production baseline data establish a baseline for the T's with which to compare the start-up.

Figure 7:
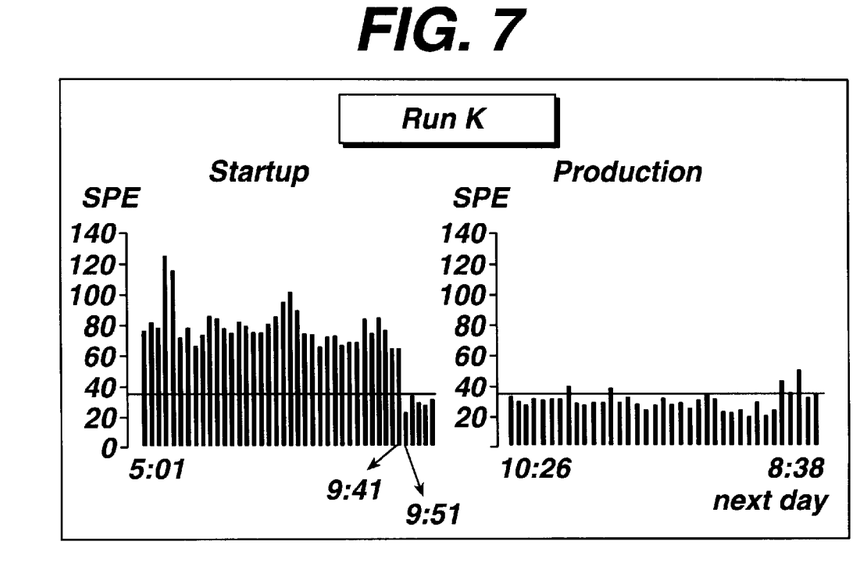
FIG. 7 shows SPE for start-up and production of a studied process.

Once the baseline has been determined, start-up monitoring proceeds. One of the tools for monitoring start-up is the SPE chart. The left bar chart of FIG. 7 shows the SPE values for the start-up time points of run K. It is clear from this chart that from the beginning of the run at 5:01 until 9:41, the values of the SPE are well above the baseline control limit. Towards the end of the start-up period at 9:51, the SPE values drop below the control limit. The right bar chart of FIG. 7 shows the SPE values for the production stage of run K. These SPE values are almost completely below the baseline control, as expected. Therefore, the operator knows at the beginning of the start-up stage that the initial process settings are inadequate.

Once the operator knows that the current process settings are inadequate, the next step is to determine which to adjust. The SPE value is decomposed into component contributions of process variables to determine which of the process variables are candidates for adjustment.

Figure 8:
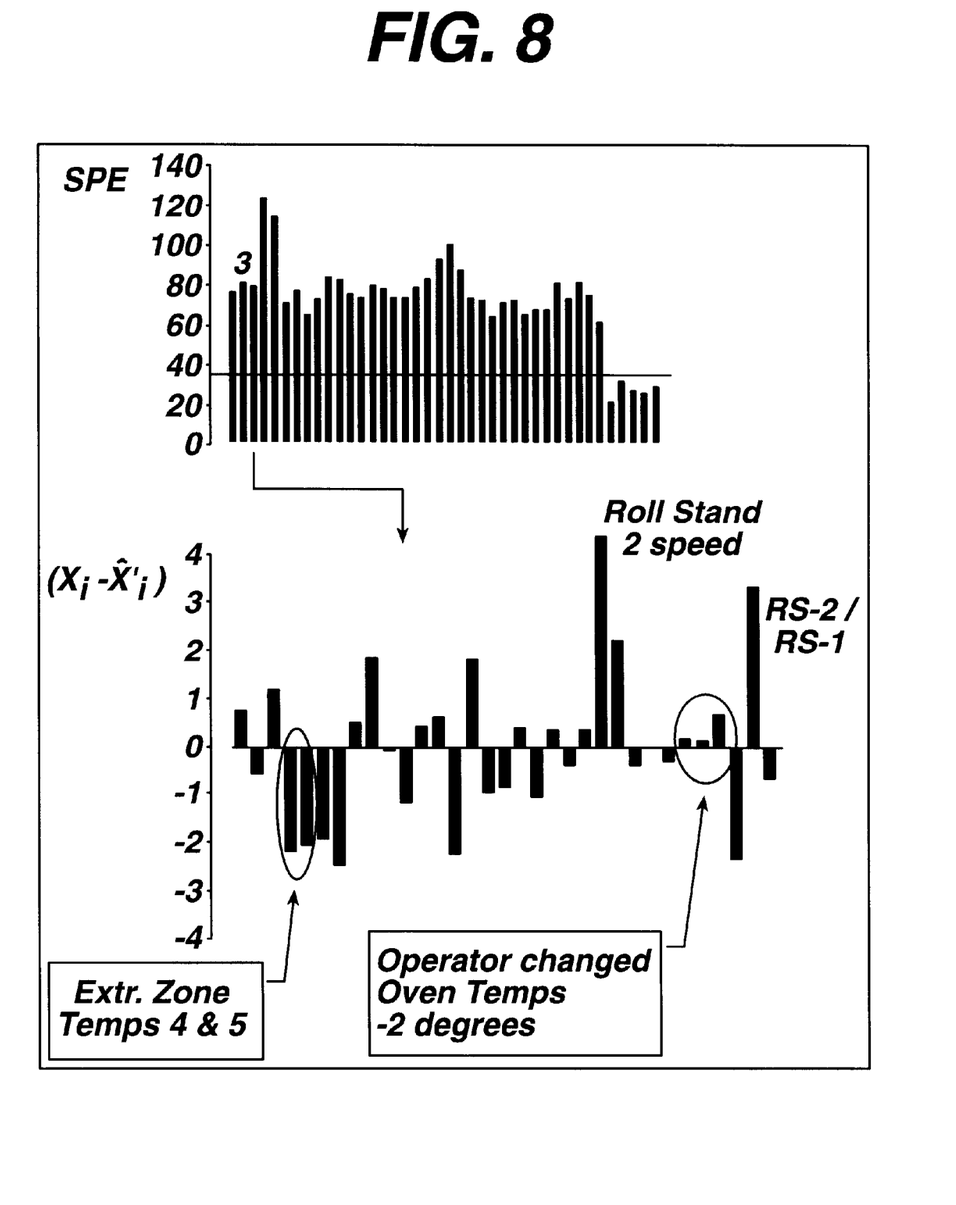
FIG. 8 shows a contribution chart for SPE at time point 3.

The upper graph of FIG. 8 repeats the start-up SPE bar chart and highlights the SPE bar at the third time point. The SPE value is a sum of squared difference terms of the form $(X_i-X'_i)$. The lower bar chart of FIG. 8 shows the values of the differences for every process variable. This bar chart is called a contribution plot because each bar represents the contribution from each process variable to the SPE at time point 3.

Figure 9:
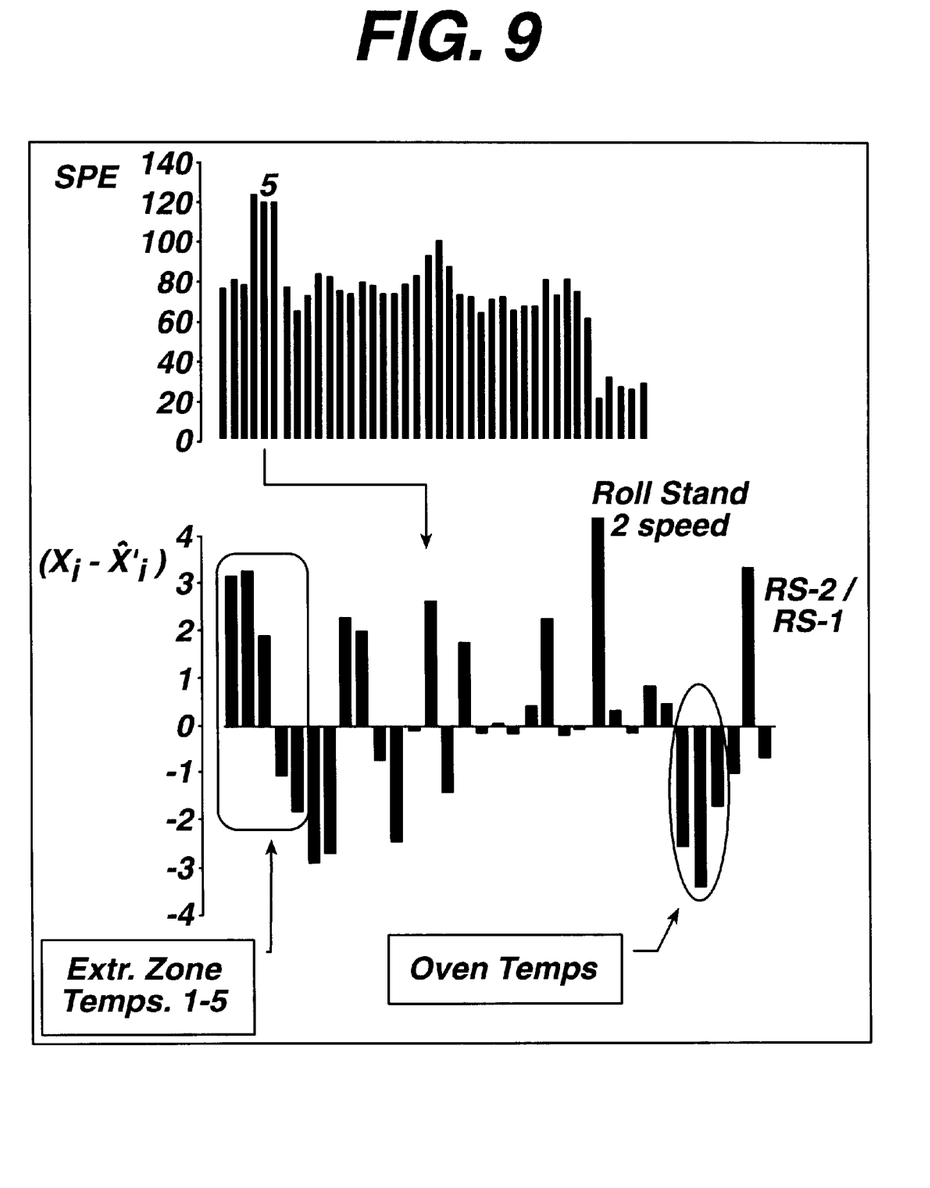
FIG. 9 shows a contribution chart for SPE indicating results of oven temperatures adjustment.

The largest bars of the contribution plot belong to variables godet stand 2 speed and the ratio of godet stand 2 speed/godet stand 1 speed, i.e. draw ratio. It is noted that the terms "godet stand" and "roll stand" may be used interchangeably. The operator chooses (unknowingly wrong) to adjust the oven temperature (FIG. 8) down two degrees. By time point 5, the oven temperatures have responded to their adjustment and it is noted that in FIG. 9 the situation has not improved. In fact, it is considerably worse. The SPE value is larger than at time point 3 and the contribution chart shows that now the godet stand speeds, extruder zone temperatures and oven temperatures have large bars. The oven temperature bars are large in the negative direction. This is the result of adjusting the oven temperatures down two degrees. The interdependencies of the process variables on each other is apparent from this contribution plot because even though the operator adjusted just the oven temperatures, many other process variables now have large or larger contributions than before.

The adjustments continue throughout the start-up as the operator looks for the right combination. For example, the extruder zones 4 and 5 are readjusted up and down several times, from 188 to 185, then to 190, then to 189. The last adjustment, which brings the process to usual production conditions, is to add those initial two degrees back to the oven temperatures and readjust the godet stand 3 speed back to its starting value. It is noted that 4 of the 8 variables adjusted throughout the start-up stage eventually were returned to the starting profile values.

The start-up stage of a run can be monitored by comparing the values of T's obtained during startup to the baseline T values. Start-up T values that plot outside the control boundaries are then decomposed to determine which process variables to adjust.

Figure 10:
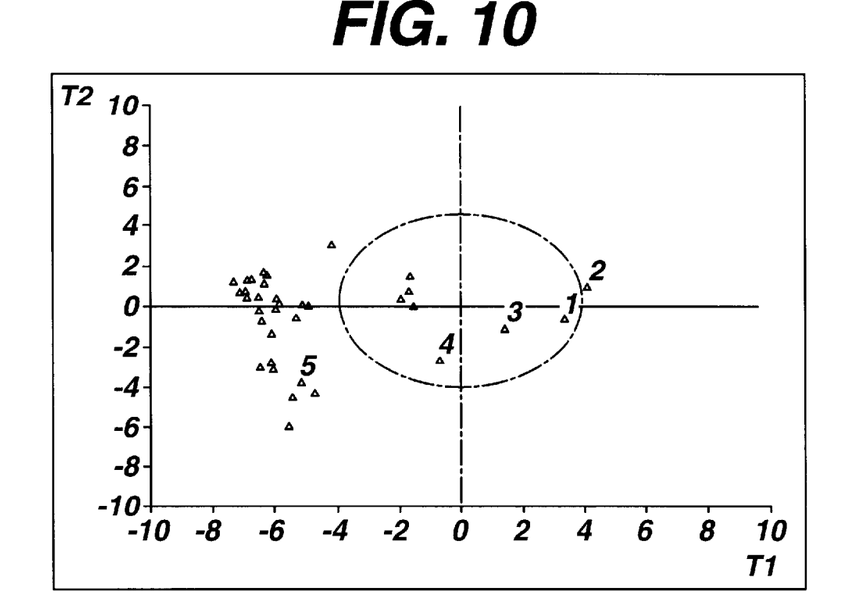
FIG. 10 shows a plot of $T_1$ versus $T_2$ for start-up of a studied process.

FIG. 10 shows start-up values of $T_1$ and $T_2$ along with the baseline ellipse. The first 5 time points are numbered. Beginning with time point 5, all subsequent time points cluster together outside of the control ellipse indicating nonconformity with the production baseline. As with SPE, one can decompose in search of the offending process variables.

Figure 11:
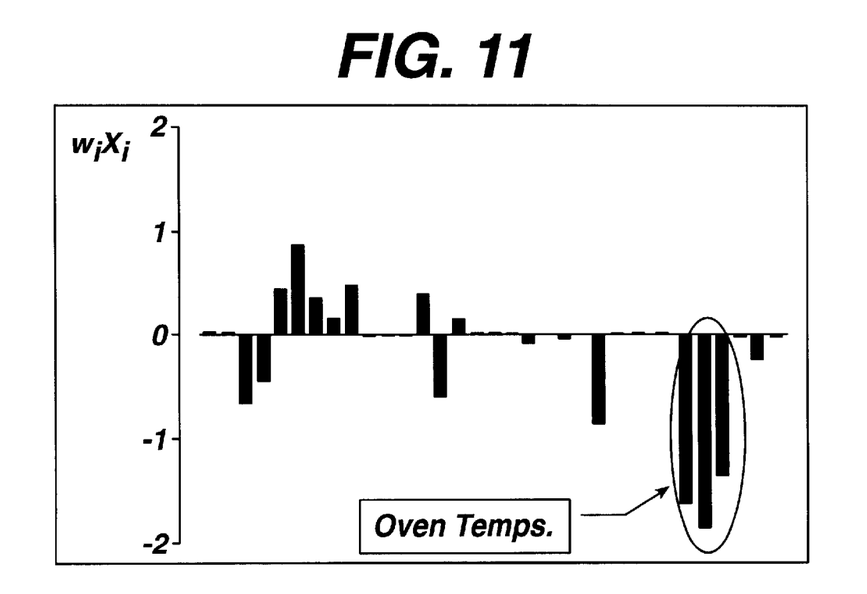
FIG. 11 shows a contribution chart for $T_1$ at time point 5.

Starting with time point 5 in the T versus T plot indicates unusual production and so the next step is to determine which process variables to adjust. FIG. 11 shows the decomposition of $T_1$ at time point 5. Each bar in FIG. 11 is a contribution of a process variable to the value of $T_1$ at time point 5. Only those contributions that have the same as $T_i$ are considered. The largest negative bars in FIG. 11 are the oven temperatures. This is consistent with the findings from the SPE contribution chart for this time point.

Figure 12:
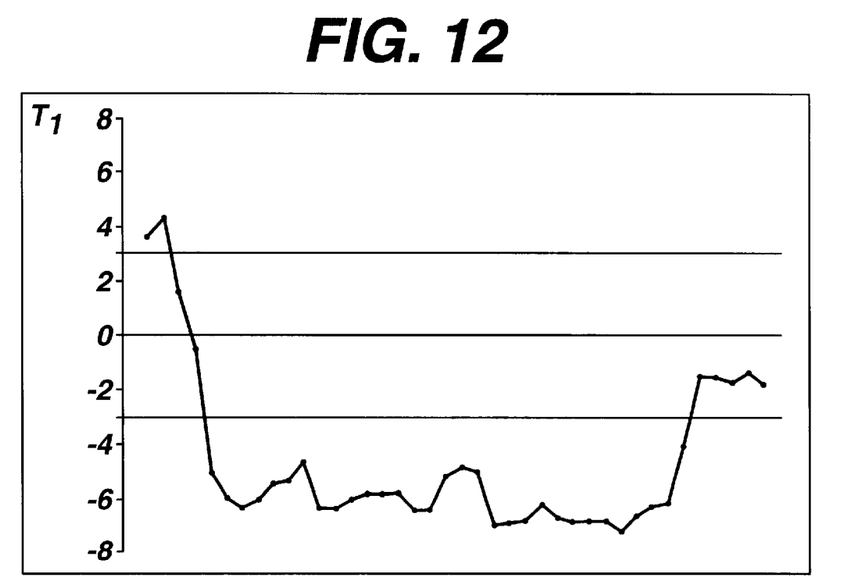
FIG. 12 shows a control chart for $T_1$ for start-up values.

Another way to monitor start-up is with individual T control charts. FIG. 12 shows a control chart for $T_1$ for the start-up values. The control chart shows that adjustments made early in the start-up are reflected by a long string of $T_1$ values below the lower control limit.

In order to apply PLS data analysis methods to the studied process, the data generated by the process first must be organized into relational database tables. Start-up and production data about the process and product variables are contained in a process report, product characteristics report and diameters report. The process report lists set points and actual values of 34 process variables. The product characteristic report includes the results of the off-line testing on 5 product variables for each of 6 suture elements. The diameters report is the laser inspection data of another 7 product variables, one overall diameter measurement and 6 individual filaments measurements. Data from these three reports and one summary report is entered into or converted to MS Access database tables. The database structure allows for the retrieval of the data so that it conforms to the requirements of the PLS analysis.

Figure 13:
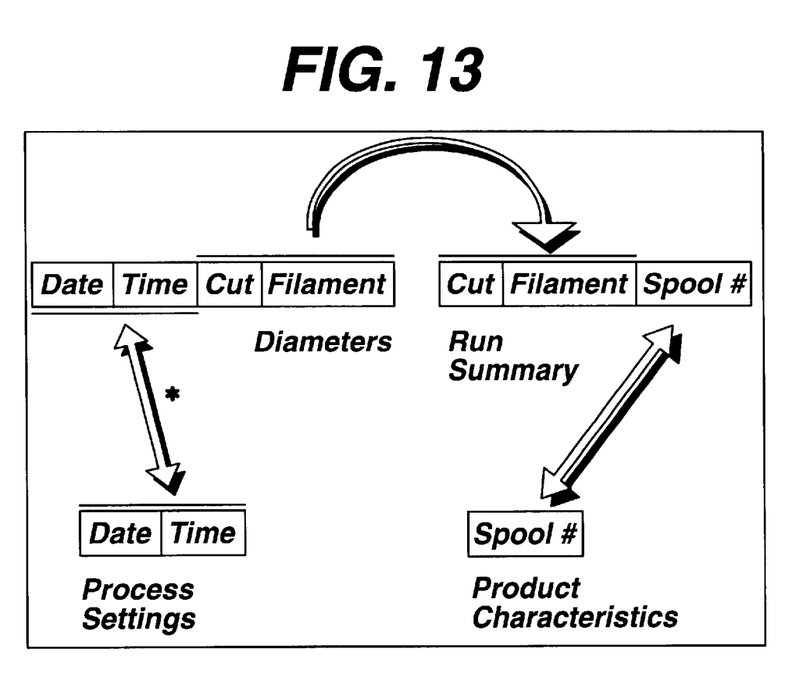
FIG. 13 shows a join for the product variable data.
Figure 14:
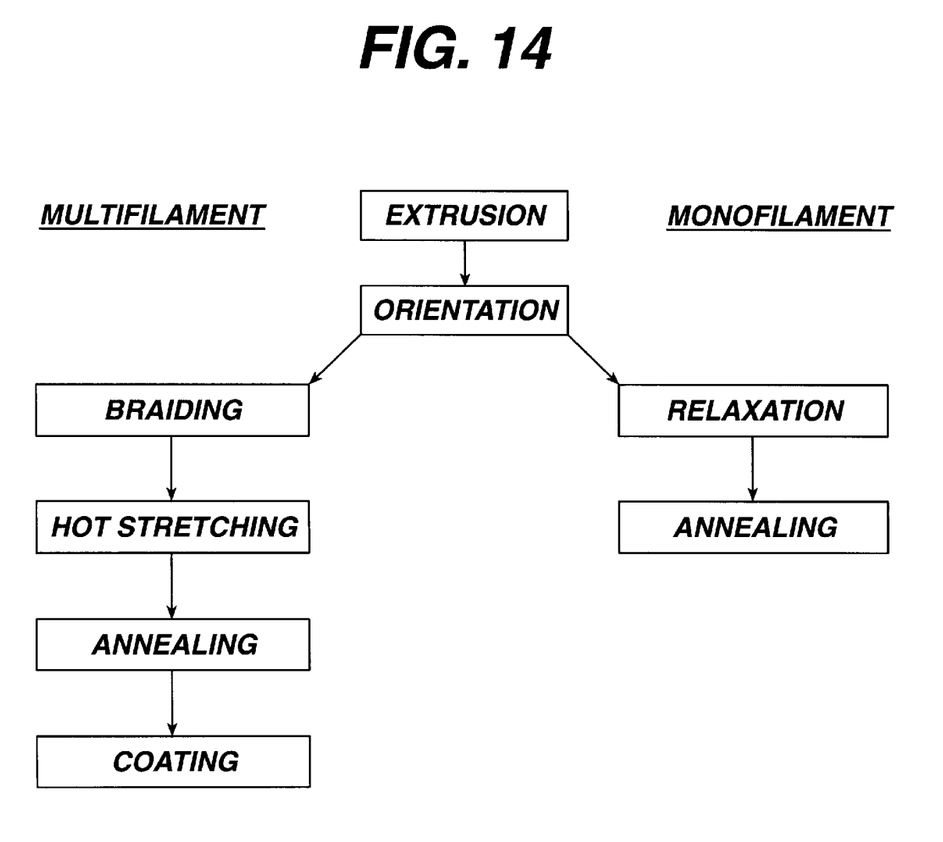
FIG. 14 is a schematic of processes for making mono and multifilament fibers.

The settings of the process variables must synchronize in time to observations of the product variables. For example, given specific product information such as filament diameter, tensile strength, etc., of one spool of suture, it is necessary to know the corresponding process variables settings that were used to produce this particular spool. FIG. 13 shows a join from the Diameters table to the Process Settings table labeled with an *. A Visual Basic program is used to join these database tables.

I claim:
1. A process for making filaments, comprising:
an extrusion step wherein molten polymers are extruded through an extrusion die, thereby forming at least one extruded filament; and an orientation step, wherein the filament is drawn to align the molecules of the filament; wherein multiple process variables of the extrusion step are monitored and data collected with respect thereto, the collected data is analyzed using a projections to latent structures technique and, optionally, process variables are adjusted in response to the analysis.

2. The process of claim 1 further comprising a quenching step after the extrusion step and prior to the orientation step, wherein process variables of the orientation step and the quenching step are monitored and data collected from the extrusion, orientation and quenching steps is analyzed using the projections to latent structures technique.

3. The process of claim 1 further comprising a step selected from the group consisting of quenching step, relaxation step, annealing step, coating step and winding step.

4. The process of claim 1 wherein the process is one to manufacture surgical sutures and the product variables are selected from the group consisting of diameter, roundness, tensile strength, elongation and knot strength of the extruded and/or oriented filament and the process variables are selected from the group consisting of extruder feed temperature, extruder transition temperature, extruder meter temperature, extruder die adapter temperature, extruder die cavity temperature, extruder melt temperature, extruder inlet water temperature, extruder outlet water temperature, extruder barrel pressure, extruder filter pressure, extruder pack pressure, extruder screw speed, extruder pump speed, quench tank temperature, take away godet speed, godet roller speeds, godet roller temperatures, oven temperatures and godet draw ratios.

* * * * *